(12) United States Patent
Veltrop et al.

(10) Patent No.: US 7,217,906 B2
(45) Date of Patent: May 15, 2007

(54) APPARATUS AND METHOD OF TOASTING BREAD-TYPE FOOD PRODUCTS

(75) Inventors: Loren J. Veltrop, Deerfield, IL (US); Michael M. Maciejewski, St. Charles, IL (US); Henry Villegas, Glenview, IL (US)

(73) Assignee: Prince Castle Inc, Carol Stream, IL (US)

( * ) Notice: Subject to any disclaimer, the term of this patent is extended or adjusted under 35 U.S.C. 154(b) by 0 days.

(21) Appl. No.: 11/134,487

(22) Filed: May 20, 2005

(65) Prior Publication Data

US 2006/0261056 A1  Nov. 23, 2006

(51) Int. Cl.
*A47J 37/08* (2006.01)

(52) U.S. Cl. .................. 219/386; 219/404; 99/327; 99/329 RT (58) Field of Classification Search .................. None
See application file for complete search history.

(56) References Cited

U.S. PATENT DOCUMENTS

| | | | |
|---|---|---|---|
| 1,948,693 A * | 2/1934 | Beardsley | 99/327 |
| 2,548,958 A * | 4/1951 | Dirosa et al. | 99/327 |
| 2,552,135 A * | 5/1951 | Bertino | 99/391 |
| 2,644,392 A * | 7/1953 | Foster | 99/329 R |
| 3,693,536 A | 9/1972 | Carville et al. | |
| 3,789,749 A * | 2/1974 | Paaskesen | 99/391 |
| 3,824,915 A * | 7/1974 | Capucio | 99/329 RT |
| 4,261,257 A | 4/1981 | Henderson et al. | |
| 4,404,898 A | 9/1983 | Chaudoir | |
| 4,454,803 A * | 6/1984 | Wolf et al. | 99/329 RT |
| 4,530,276 A | 7/1985 | Miller | |
| 5,522,306 A * | 6/1996 | DeMars | 99/329 RT |
| 5,673,610 A | 10/1997 | Stuck | |
| 5,746,116 A | 5/1998 | Smith | |
| 5,937,739 A * | 8/1999 | Schultz | 99/327 |
| 5,983,785 A | 11/1999 | Schreiner et al. | |
| 6,192,789 B1 | 2/2001 | Agcaoili et al. | |
| 6,223,650 B1 | 5/2001 | Stuck | |
| 6,281,478 B2 | 8/2001 | Chandler et al. | |
| 6,584,889 B2 * | 7/2003 | Friel, Sr. | 219/386 |

* cited by examiner

*Primary Examiner*—Joseph Pelham
(74) *Attorney, Agent, or Firm*—John R. Hoffman (57) ABSTRACT

A dual function heating and toasting apparatus is provided for radiantly heating or surface toasting bread-type food products. The apparatus includes a housing defining a heating/toasting chamber. A generally vertically oriented, center fixed heating platen is disposed in the chamber. A pair of generally vertically oriented, movable heating platens are disposed on opposite sides of the center fixed platen. A gate is movably mounted on the housing near the bottoms of the platens for movement between a closed position to hold a product between the platens and an open position allowing a finished product to exit the chamber. A product such as a bagel can be placed into the chamber onto the gate between one of the movable platens and the fixed platen and spaced therefrom to heat the bagel by radiant heat. Alternatively, a product such as a bun can be placed in the chamber onto the gate and the movable platen moved to bias the bun against the fixed platen to surface toast the bun. The gate is movable to the open position to allow the heated bagel or the toasted bun to exit the chamber.

23 Claims, 13 Drawing Sheets

APPARATUS AND METHOD OF TOASTING BREAD-TYPE FOOD PRODUCTS

FIELD OF THE INVENTION

This invention generally relates to the art of toasting apparatus and, particularly, to a dual function heating and toasting apparatus for radiantly heating or surface toasting bread-type food products, along with a method of surface toasting products such as buns or the like.

BACKGROUND OF THE INVENTION

Toasting apparatus are used in a wide variety of applications ranging from simple two-slice toasters used in the home to more elaborate toasting apparatus used in restaurants, such as fast food restaurants, for preparing various bread-type food products. Some toasters have flat heated platens for engaging and "caramelizing" the flat surface of certain products such as sandwich buns. In other words, the inner flat surfaces of the two bun halves are pressed against the flat heated platens to give the desired toasted finish on the surfaces of the bun or other such bread product. Other toasters use radiant heat and are used for toasting such bread products as bagels, muffins or the like. In these types of toasters, the bread product is not actually touched or pressed against a flat heated surface or platen.

In many restaurant establishments, such as fast food restaurants, radiant toasters are used during "breakfast time" for toasting such products as bagels, muffins, croissants or the like with radiant heat. After the breakfast time, the radiant toaster is moved out of the way and a second "lunch or dinner time" toaster is brought out for toasting the flat surfaces of other bread products such as sandwich buns, slices of bread or the like. Problems with such systems involve the fact that two separate toasters are required to perform two separate toasting functions or processes. This requires multiple expenditures, multiple shelf space, multiple cleaning jobs and other related problems. The present invention is directed to solving these problems by providing a new and improved dual function toaster, along with a novel platen and gate system, as well as a unique method of surface toasting buns or other such bread-type food products.

SUMMARY OF THE INVENTION

An object, therefore, of the invention is to provide a new and improved toasting apparatus of the character described, along with a novel surface toasting method.

In the exemplary embodiment of the invention, a dual function heating and toasting apparatus is provided for radiantly heating or surface toasting bread-type food products. The apparatus includes a housing defining a heating/toasting chamber. A generally vertically oriented, center fixed heating platen is disposed in the chamber. A pair of generally vertically oriented, outside fixed heating platens are spaced outwardly from opposite sides of the center fixed platen. A pair of generally vertically oriented, movable heating platens are disposed on opposite sides of the center fixed platen inside the pair of outside fixed platens. Gate means are movably mounted on the housing near the bottoms of the platens for movement between a closed position to hold a product between the platens and an open position allowing a finished product to drop out of the chamber.

With the above structural combination, a product such as a bagel can be placed into the chamber onto the gate means between one of the movable platens and one of the fixed platens and spaced therefrom to heat the bagel by radiant heat. Or, a product such as a bun can be placed into the chamber onto the gate means between one of the movable platens and one of the fixed platens, with the movable platen biasing the bun against the fixed platen to surface toast the bun. The gate means is movable to the open position to allow the heated bagel or the toasted bun to drop out of the chamber.

As disclosed herein, the movable platens are movable between heating positions spaced away from the outside fixed platens for radiantly heating a pair of products therebetween. The movable platens are movable to toasting positions toward the center fixed platens for surface toasting a pair of products on opposite sides thereof. The fixed heating platens are heated platens. The movable heating platens are fabricated of heat conductive material for absorbing and radiating heat from the heated fixed platens.

According to one aspect of the invention, the gate means are pivotally mounted on the housing for pivotal movement between a raised, closed position and a lowered, open position. At least one solenoid is mounted on the housing and is mechanically coupled to the gate means to pivot the gate means between the raised and lowered positions. At least one cam is pivotally mounted on the housing and includes a cam profile engageable with the gate means. The solenoid is operatively associated with the cam for pivoting the cam.

According to another aspect of the invention, the movable platens are horizontally slidably mounted on the housing. At least one motor is mechanically coupled to the movable platens to move the platens between the heating and toasting positions. The motor includes a rotating member eccentrically connected by link arms to the slidably mounted movable platens.

According to a further aspect of the invention, the housing includes an auxiliary toasting chamber for surface toasting both sides of a product such as a club section of a bun. A generally vertically oriented, fixed heated platen is disposed centrally of the auxiliary toasting chamber. A generally vertically oriented, movable heated platen biases the club section against the fixed platen for surface toasting both sides of the club section. In the preferred embodiment, the fixed heated platen in the auxiliary toasting chamber comprises an extension of the center fixed platen in the main heating/toasting chamber. The invention contemplates a pair of the movable heated platens at opposite sides of the fixed heated platen in the auxiliary toasting chamber for toasting both sides of a pair of club sections.

In an alternative embodiment of the dual function toaster, a single fixed heated platen is provided with a pair of movable heating platens disposed on opposite sides thereof. The movable platens are mounted for movement toward and away from the fixed platen between a heating position away from the fixed platen and a toasting position near the fixed platen.

Other features of the invention include the provision of a screen on the side of each movable platen which faces the fixed platen against which the product is surface toasted.

The invention contemplates a method of surface toasting a food product by biasing the food product against the surface of a heated platen for a given amount of time. The movable platen then is backed off slightly to allow the product to expand while still surface toasting, whereafter the movable platen moves completely away from the fixed platen to allow the product to exit the chamber.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
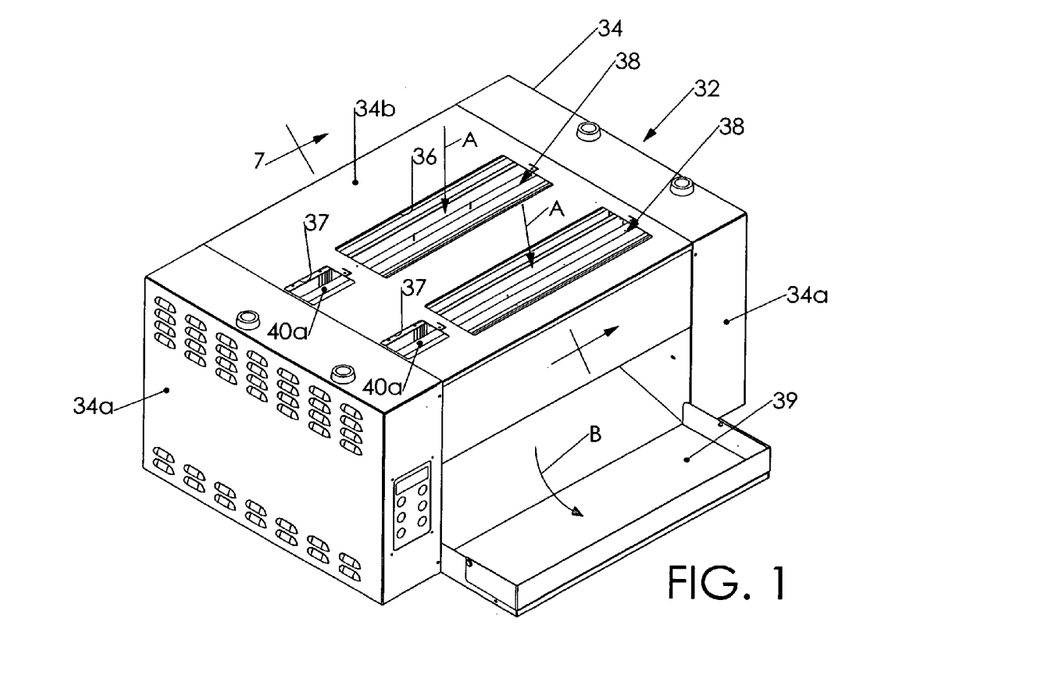
FIG. 1 is a perspective view of a dual function heating and toasting apparatus according to one embodiment of the invention.
Figure 2:
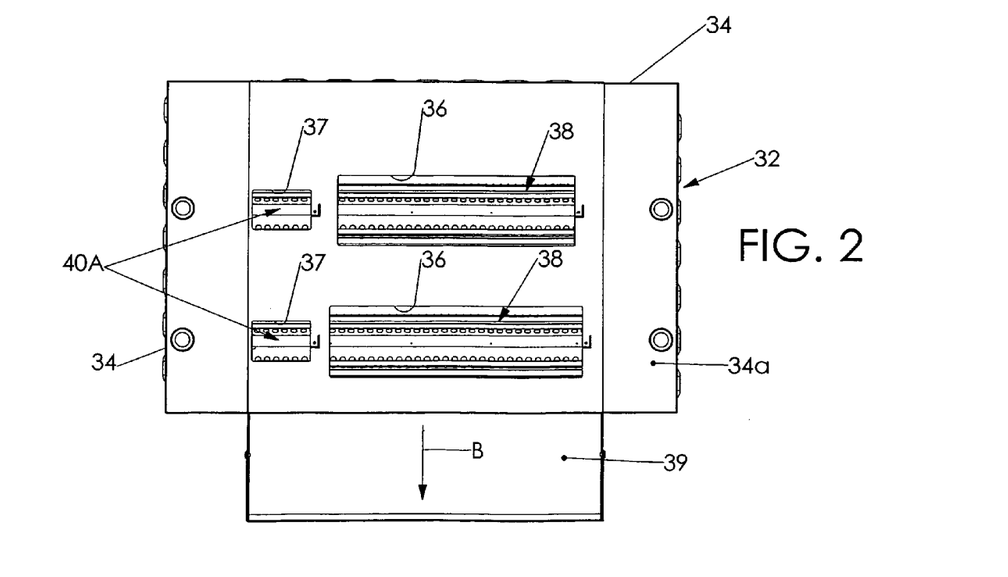
FIG. 2 is a top plan view of the apparatus of FIG. 1.
Figure 3:
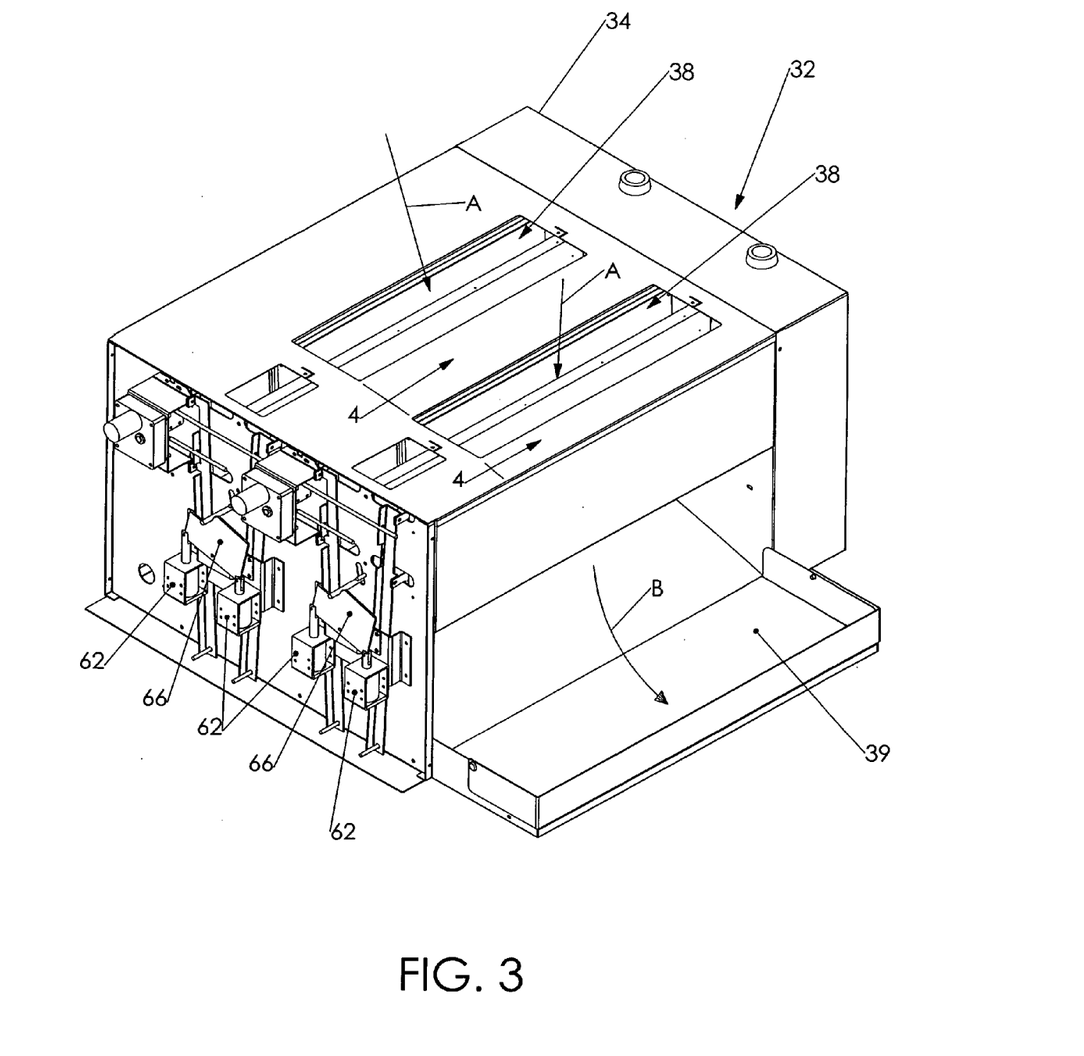
FIG. 3 is a view similar to that of FIG. 1, with a side wall of the housing removed to facilitate the illustration.

Referring to the drawings in greater detail, and first to FIGS. 1–3, the invention is embodied in a dual function heating and toasting apparatus, generally designated 32, for radiantly heating or surface toasting bread-type food products. Before proceeding with a detailed description of the apparatus, a general commentary on the overall function of the apparatus is in order. Specifically, what happens in most restaurant establishments, such as fast food restaurants, is that a radiant toaster is used during "breakfast time" in the morning for toasting such products as bagels, muffins or the like with radiant heat. After the breakfast time, the radiant toaster is moved away, and a second sandwich toaster is brought out for "lunch or dinner time" for toasting the flat surfaces of other bread products such as hamburger buns or slices of bread to "caramelize" the flat surfaces of the products. The two toasters require considerable space even when not in use. The single toaster disclosed and claimed herein performs both functions of either radiantly heating or surface toasting bread-type food products.

With those understandings, and referring back to FIGS. 1–3, apparatus 32 includes a housing 34 which may be fabricated of formed sheet metal material. The housing includes a pair of vented, removable side walls 34a to gain access to various components of the apparatus. One of the side walls is shown removed in FIG. 3. A pair of elongated, generally parallel, larger openings 36 are formed in a top wall 34b of the housing. A pair of smaller openings 37 are formed in the top wall at one end of the larger openings. A pair of heating/toasting chambers, generally designated 38, are provided within the housing immediately beneath the openings. Bread-type food products are deposited through the openings into chambers 38 in the direction of arrows "A". After the products are either radiantly heated or surface toasted, the products drop into a service tray 40 in the direction of arrow "B".

Before proceeding with a further detailed description of apparatus 32, certain terms must be defined for use herein. In the industry and in much of the prior art, the terms "toaster", "toasting" and the like have been used in a wide variety of applications to describe practically any apparatus or practically any process which acts upon a bread-type food product. If a product such as a bun or a slice of bread is surface toasted, the apparatus is called a "toaster". If a product such as a bagel or croissant is radiantly heated, the apparatus still is called a "toaster". Following that common usage would be confusing herein since a single apparatus is performing either function. Such usage also would be confusing herein because various movable heating platens are used for both radiantly heating a product as well as surface toasting a product. Therefore, the term "heating" platen will be used herein to described a platen whether or not it is directly heated or not. In addition, the functions on the bread-type food products will be described as either being "radiantly heated" or "surface toasted" in order to avoid confusion.

With the understandings immediately above, reference now is made to FIG. 4 wherein one of the heating/toasting chambers 38 of housing 34 beneath one of the larger openings 36 will be described. A generally vertically oriented, center fixed heating platen 40 is appropriately mounted within the housing and is centrally disposed within the chamber. A pair of generally vertically oriented, outside fixed heating platens 42 are appropriately mounted within the housing and are spaced outwardly from opposite sides of center fixed platen 40 within chamber 38. A pair of generally vertically oriented, movable heating platens 44 are appropriately movably mounted within the housing in chamber 38 on opposite sides of center fixed platen 40 inside the pair of outside fixed platens 42. Platens 44 are movable in the direction of double-headed arrows "C" toward and away from center fixed platen 40 as well as toward and away from outside fixed platens 42. All of the platens are elongated, generally planar components of a finite thickness.

The center and outside fixed platens 40 and 42, respectively, are heated platens. In other words, the platens have heating elements embedded therein. Movable platens 44 are passive heating platens. In other words, the movable platens are fabricated of a heat conductive material for absorbing and radiating heat from the heated fixed platens.

Figure 4:
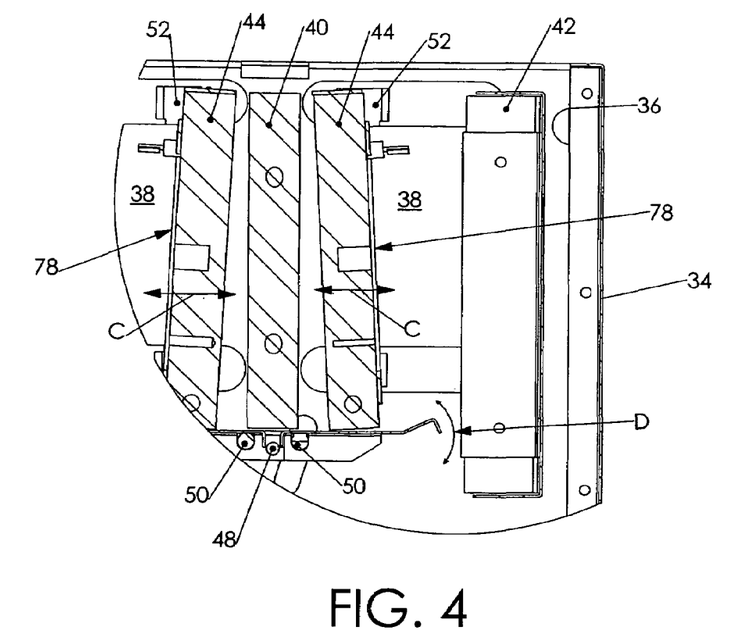
FIG. 4 is an enlarged, fragmented vertical section taken generally along line 4—4 in FIG. 3.

Still referring to FIG. 4, a pair of elongated gates 46 close the bottom of chamber 38 between center fixed platen 40 and outside fixed platens 42. The gates are pivotally mounted for reciprocal movement in the direction of double-headed arrows "D" about a common pivot shaft 48. The gates are raised and lowered by a pair of lift rods 50, as will be seen hereinafter.

Figure 5:
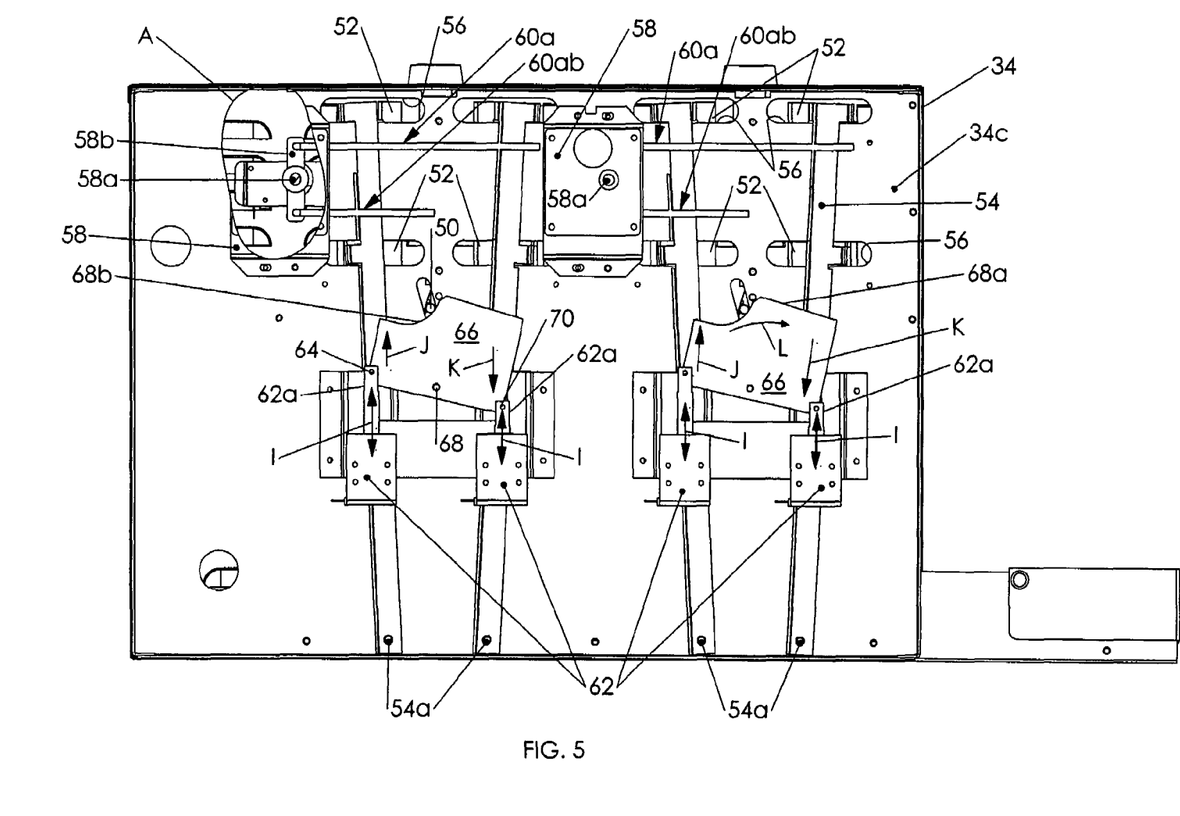
FIG. 5 is a side elevational view looking at the side of the apparatus in FIG. 3 where the side wall of the housing has been removed.
Figure 6:
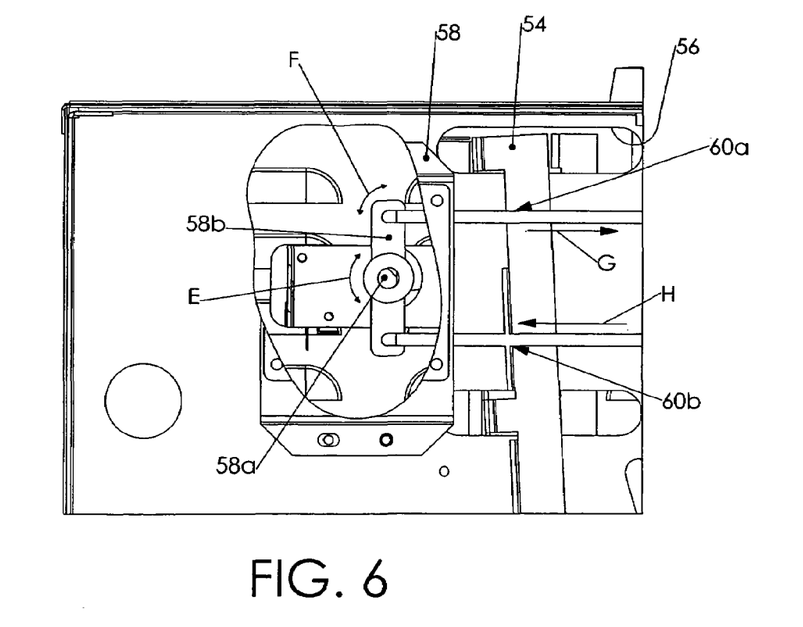
FIG. 6 is an enlarged fragmented view of the upper left-hand corner of FIG. 4.

FIGS. 3, 5 and 6 show a system for conjointly moving movable platens 44 in each chamber 38 either in a direction toward center fixed platen 40 and away from outside fixed platens 42 or in a direction toward the outside fixed platens and away from the center fixed platen. More particularly, the movable platens are connected by brackets 52 to two pairs of long actuator arms 54 (FIG. 5). The brackets slide within slots 56 in an interior wall 34c of housing 34. Actuator arms 54 are pivotally mounted to the interior wall at 54a. A pair of stepping motors 58 are mounted to the outside of interior wall 34c. Each motor has a rotating member 58a which is fixed to an eccentric arm 58b which rotates or pivots with the rotating member. A motor 58 is provided for each pair of actuating arms 54 and, therefore, each pair of movable platens 44 in each heating/toasting chamber 38. A short link arm 60a and a long link arm 60b are pivotally connected at adjacent ends to eccentric arm 58b. The short link arm is pivotally connected to the left-hand actuator arm 54 in the respective pair thereof as seen in FIGS. 3, 5 and 6. The long link arm 60b is pivotally connected to the right-hand actuator arm 54 in each pair of thereof. With this linkage system, and referring specifically to the enlarged depiction of FIG. 6, when motor 58 is stepped to cause rotating member 58a to rotate in the direction of arrow "E", eccentric arm 58b will rotate or pivot in the direction of arrow "F". This will cause short link arm 60a to move generally linearly in the direction of arrow "G", while long link arm 60b moves generally linearly in the opposite direction of arrow "H". When the link arms move in opposite direction as indicated, actuator arms 54 are caused to pivot toward each other about pivots 54a (FIG. 5). This causes movable platens 44 to move toward each other toward opposite sides of center fixed platen 40 as seen in FIG. 4. If motor 58 is stepped in the opposite direction to cause rotating member 58a to rotate opposite the direction of arrow "E", eccentric arm 58b rotates opposite arrow "F" and link arms 60a and 60b move opposite arrows "G" and "H", respectively, to cause movable platens 44 to move away from center fixed platen 40 and toward outside fixed platens 42.

FIGS. 3 and 5 show a means for lifting (closing) and dropping (opening) gates 46 (FIG. 4). Specifically, four solenoids 62 are mounted to the outside of interior wall 34c of the housing. Each solenoid includes an operating rod 62a which reciprocates in the direction of arrow "I". The following will be described for one pair of solenoids which are effective to lift and/or drop a single one of the gates 46 on one side of center fixed platen 40 as seen in FIG. 4.

With that understanding, looking at the left-hand pair of solenoids 62 in FIG. 5, operating rod 62a of the left solenoid is pivotally connected, at 64, to a cam plate 66 which is pivotally mounted, as at 68, to interior wall 34c of the housing. The operating rod 62a of the right-hand solenoid is pivotally connected to the cam plate at 70. The top edge of the cam plate is divided into a top, generally horizontal cam edge 68a and an arcuate dropping cam edge 68b. It can be seen that the left-hand lift rod 50 (also see FIG. 4) for the left gate 46 of the left chamber 38 rides along the cam profile at the top of cam plate 66. It can be seen in FIG. 5 that lift rod 50 is resting on the top of generally horizontal cam edge 68a. In this position, the lift rod maintains the respective gate 46 in its lifted or closed position shown in FIG. 4.

In order to drop the respective gate 46, solenoids 62 are stepped so that the operating rod 62 of the left-hand solenoid moves upwardly in the direction of arrow "J", and the operating rod of the right solenoid moves downwardly in the direction of arrow "K". This causes cam plate 66 to pivot about pivot 68 in the direction of arrow "L". As the cam plate pivots, the weight of gate 46 causes lift rod 50 to drop into the arcuate cam edge 68b of the cam plate, whereupon the gate drops to open chamber 38 and allow the bread-type food product (which has been either radiantly heated or surface toasted) to drop into service tray 39. In order to lift the gate, the respective pair of solenoids are stepped in the opposite direction to rotate cam plate 68 opposite arrow "L" back to the position shown in FIG. 5. As the cam plate rotates back, lift rod 50 rides back up arcuate cam edge 68b and onto top cam edge 68a, whereupon the gate is maintained in its raised or closed position.

While FIG. 5 and other figures show four solenoids mounted to interior wall 34c of the housing, these solenoids are effective to operate only one gate in each pair thereof for each chamber 68. For instance, in FIG. 5, cam plates 66, with their respective solenoids, are operatively associated with the left-hand gates in the two chambers, as viewed in the direction of FIG. 5. There are four additional solenoids and two additional cam plates mounted to an interior wall at the opposite side of the housing to operate the other gate in each pair thereof. Since the operating structure is identical, the depictions and the above description have not been repeated herein in order to provide a more concise description of the invention.

The sequence of operation of the dual function heating and toasting apparatus 32 of the invention now will be described in relation to FIGS. 7–24. Although a wide range of controls ranging from pure mechanical controls to electronic controls are contemplated by the invention to actuate motors 58 and solenoids 62 in proper sequences, a programmed microprocessor is contemplated by the invention. The motors and solenoids are easily timed for any specific sequential operation or stepping by such a simple control as a microprocessor.

Figure 7:
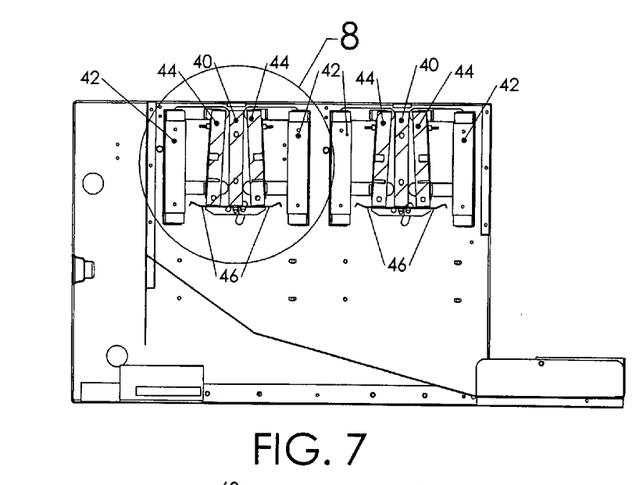
FIG. 7 is a vertical section taken generally along line 7—7 of FIG. 1, with the movable platens in their "breakfast" open positions and the gates in their closed/elevated positions.
Figure 8:
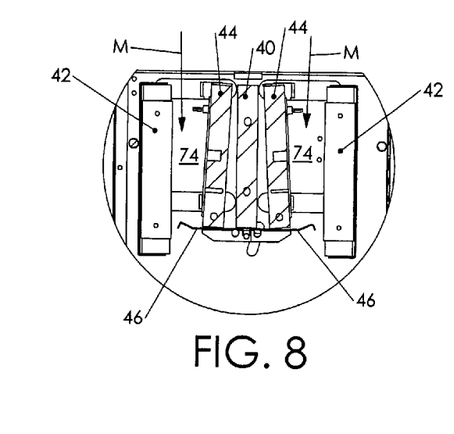
FIG. 8 is an enlarged depiction of the area encircled at "8" in FIG. 7.
Figure 9:
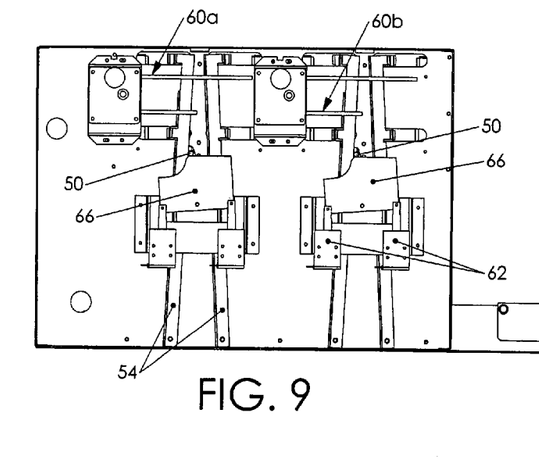
FIG. 9 is a view similar to that of FIG. 4, with the components in their respective positions corresponding to the positions of the platens and the gates in FIG. 7.

Accordingly, FIGS. 7–15 show a sequence of operation for radiantly heating a bread-type food product such as a bagel, muffin, croissant or the like in a "breakfast" mode. First of all, FIGS. 7–9 show a "breakfast open" condition of the apparatus similar to that depicted in FIGS. 4 and 5. In this condition, movable platens 44 have been moved toward center fixed platen 40 to create spaces 74 between the movable platens and the outside fixed platens. The products to be radiantly heated are deposited into spaces 74 in the direction of arrows "M" on top of gates 46 which are being maintained in their lifted or closed positions by cam plates 66 and solenoids 62.

Figures 10, 11, 12:
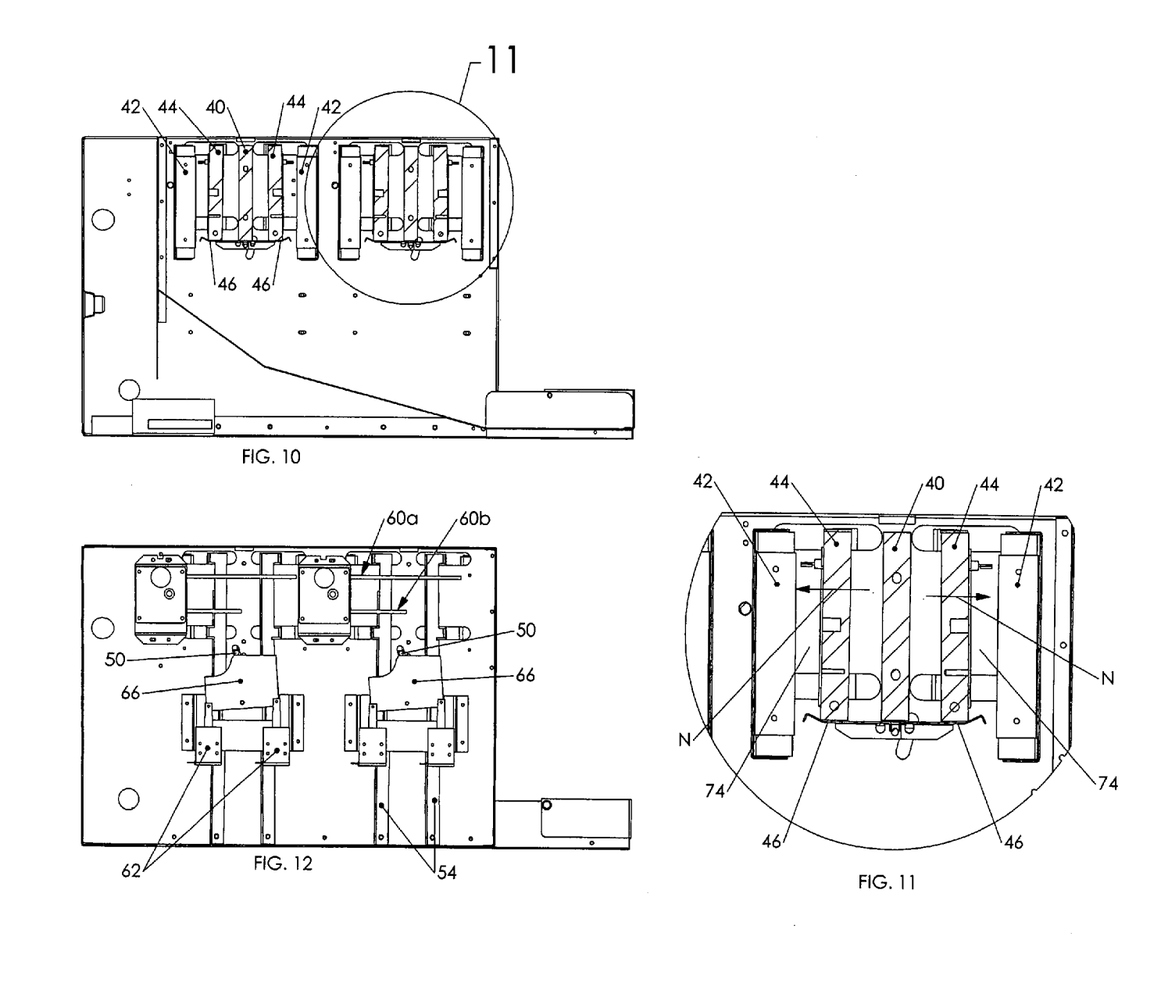
FIGS. 10–12 are views similar to that of FIGS. 7–9, with the components in their respective "breakfast" closed positions.
Figure 13:
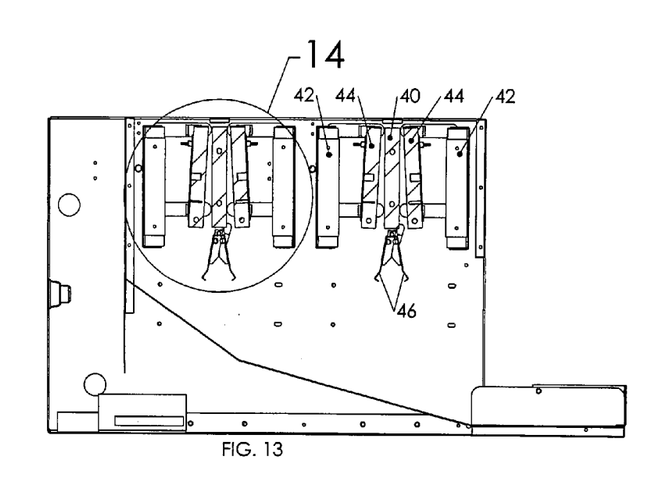
FIGS. 13–15 are views similar to that of FIGS. 7–9, with the components in their respective "breakfast" drop positions.
Figure 14:
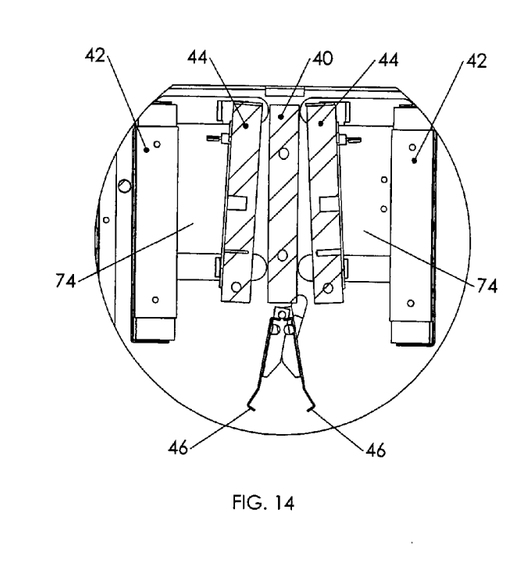
Figure 15:
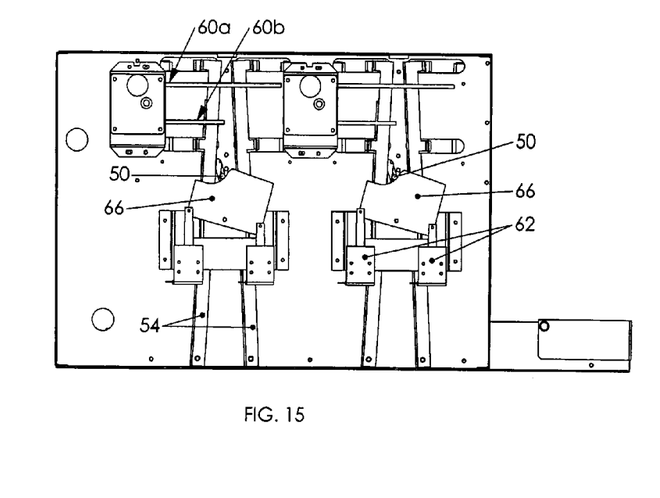

Referring to FIGS. 10–12, after the products have been deposited into spaces 74, the microprocessor steps motors 58 to move the movable platens 44 outwardly in the direction of arrows "N" toward outside fixed platens 42 only a distance to "stand up" the product. The movable platens do not press the product against the outside fixed platens, because the product simply is to be radiantly heated. After a specific period of time programmed into the microprocessor, movable platens 44 are moved back inwardly as shown in FIGS. 13–15 to again fully open spaces 74. At the same time, solenoids 62 are stepped to open or drop gates 46 to allow the radiantly heated products to drop into service tray 39.

At this point, and looking back at FIGS. 1 and 2, it should be remembered that larger openings 36 are elongated. Therefore, not only can two products be positioned into the heating/toasting chamber on directly opposite sides of center fixed platen 40 or movable platens 44, but multiple products can be deposited into the chamber longitudinally of openings 36.

Figure 16:
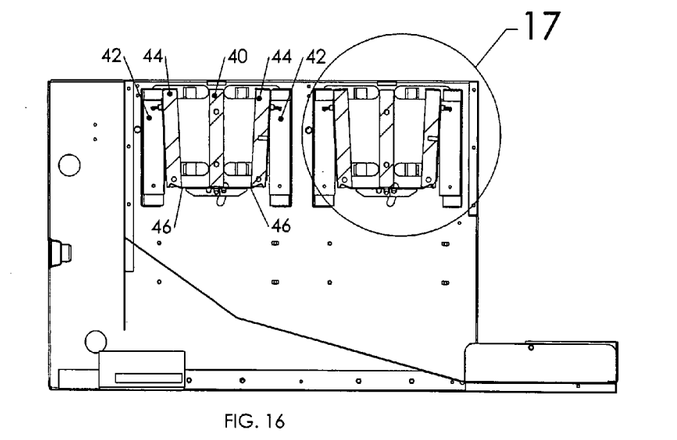
FIGS. 16–18 are views similar to that of FIGS. 7–9, with the components in their respective "sandwich" open positions.
Figure 17:
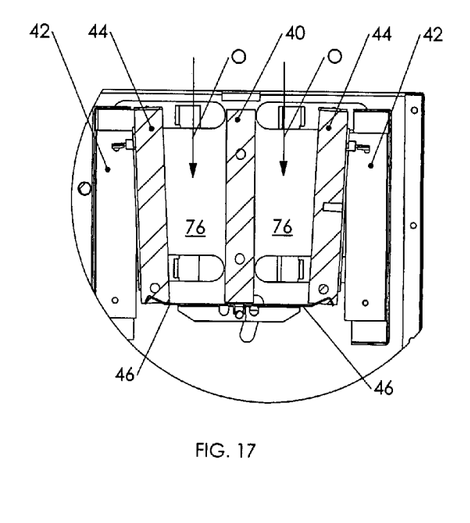
Figure 18:
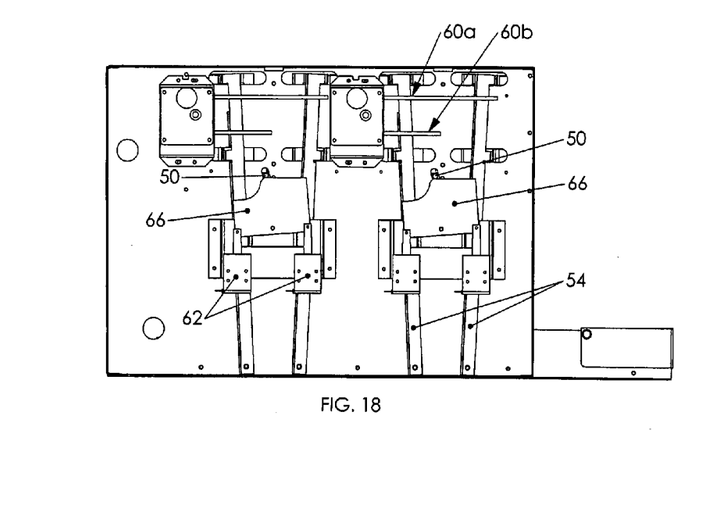
Figure 19:
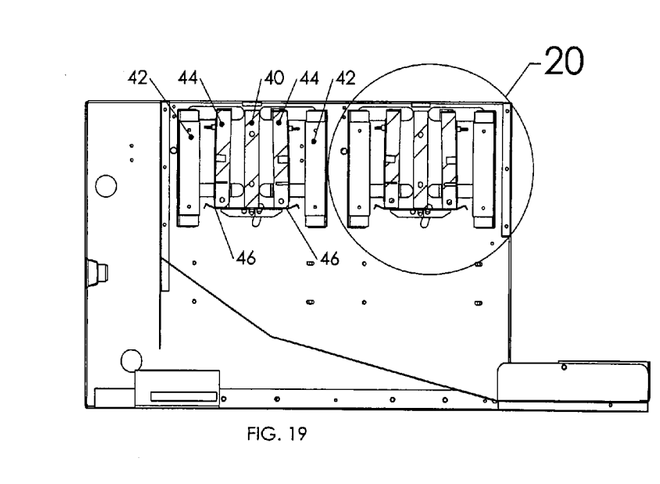
FIGS. 19–21 are views similar to that of FIGS. 7–9, with the components in their respective "sandwich" closed positions.
Figure 20:
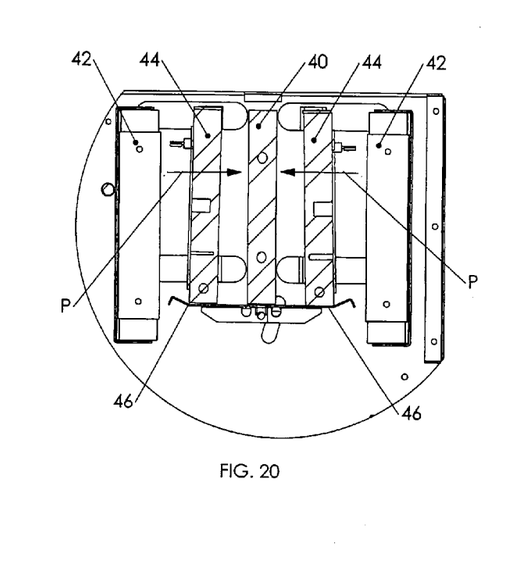
Figure 21:
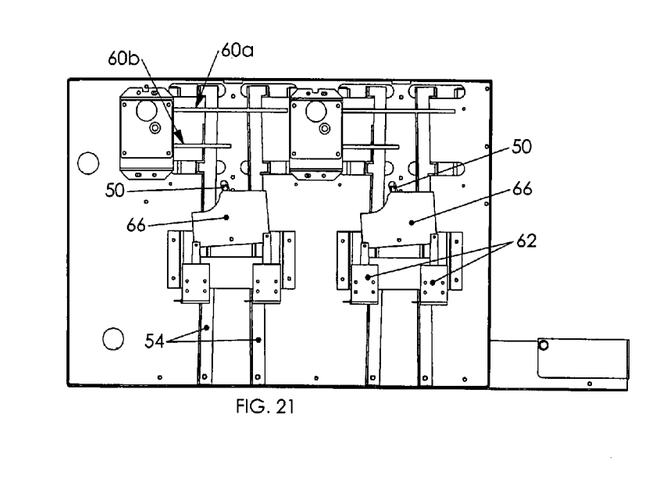

FIGS. 16–24 show the "sandwich" mode of apparatus 32 for surface toasting such bread-type food products as buns, slices of bread, rolls or the like. Specifically, FIGS. 16–18 show that movable platens 44 have been moved outwardly away from center fixed platen 40 completely toward the outside fixed platens 42. This creates spaces 76 immediately on opposite sides of the center fixed platen, between the center platen and the two movable platens which have been moved outwardly. This allows a bread-type product, such as a bun, to be easily deposited into spaces 76 in the direction of arrows "O". Of course, gates 46 are maintained in their lifted or closed positions so that the buns can be deposited directly on top of the gates.

After the buns have been deposited into the heating/toasting chamber, movable platens 44 are moved inwardly in the direction of arrows "P" (FIG. 20) to bias a flat surface of the buns against center fixed platen 40. With the center platen heated, the flat surfaces of the buns are surface toasted or "caramelized".

Figures 22, 23, 24:
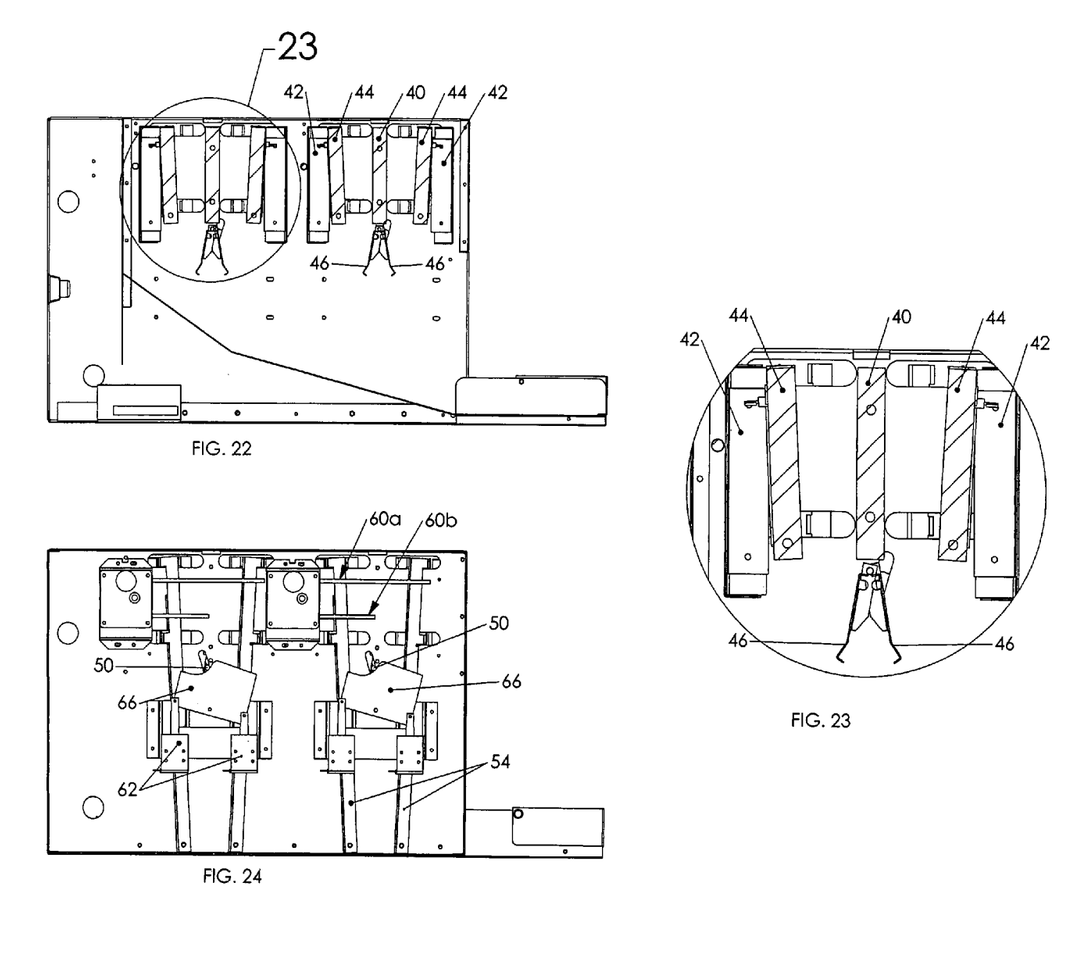
FIGS. 22–24 are views similar to that of FIGS. 7–9, with the components in their respective "sandwich" drop positions.

After the buns are surface toasted for a given programmed period of time, and referring to FIGS. 22–24, movable platens 44 are moved back outwardly to their completely open position to free the buns. Gates 46 are opened so that the completely processed buns can drop into service tray 40.

The invention contemplates a unique system which can be easily accomplished by the movable platens with simple microprocessor controls. Specifically, in the "sandwich" mode as described above in relation to FIGS. 16–24, after movable platens 44 have been moved inwardly in the direction of arrows "P" shown in FIG. 20, the movable platens are maintained in a bun-biasing condition for a given period of time, whereafter the movable platens are backed-off away from fixed heated platen 40 a small amount to allow the buns to expand during the toasting operation. After the complete toasting cycle has been achieved, the movable platens then will move to their fully open positions shown in FIGS. 22–24. In other words, the movable platens are moved outwardly from the positions of FIGS. 19–21 to the positions of FIGS. 22–24 in a two-step procedure to first press the flat surfaces of the buns against the flat surfaces of the heated center platen 40, and then to move the heated platens away from the center fixed platen a small amount sufficient to allow the buns to expand to a "fluffy" condition while still maintaining surface engagement with the center platen. Thereafter, the movable platens are fully opened to drop the completely processed buns.

Figure 25:
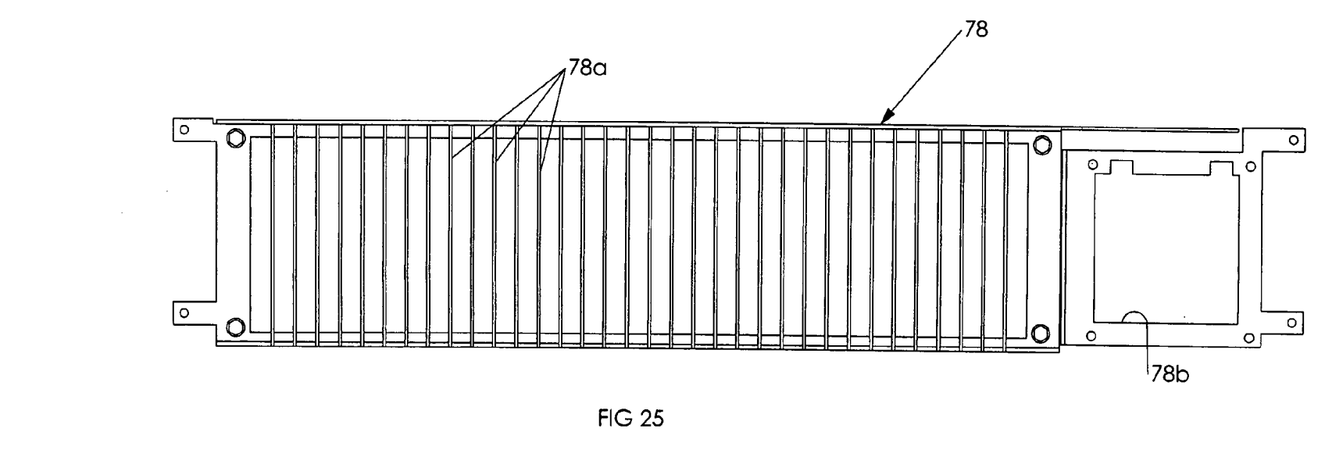
FIG. 25 is a front elevational view of one of the screens attached to the front faces of the movable platens.
Figure 26:
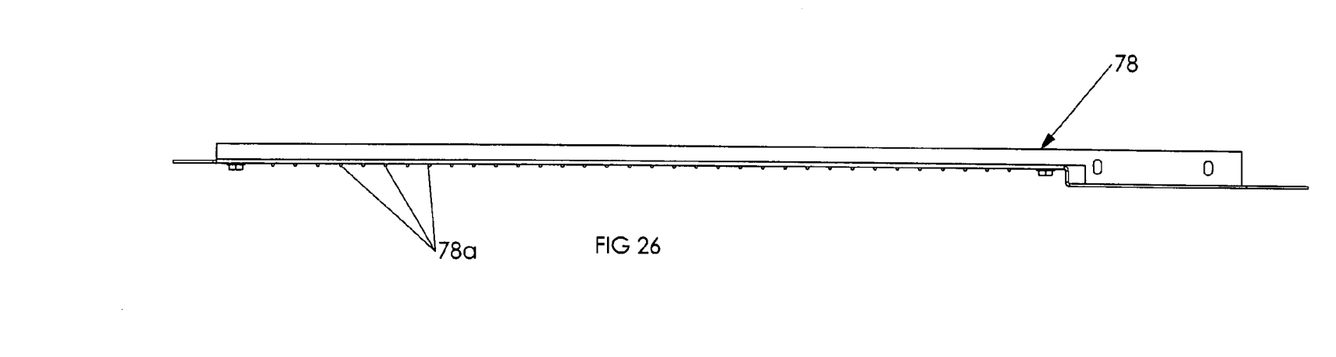
FIG. 26 is a top plan view of the screen of FIG. 25.
Figure 27:
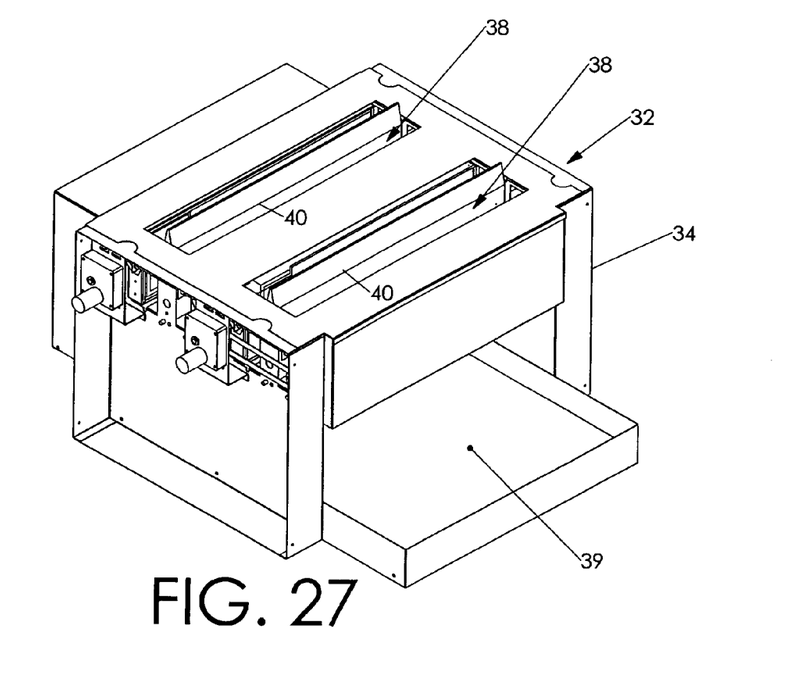
FIGS. 27–30 are views similar to that of FIGS. 1, 2, 7 and 9, but of a second embodiment of the invention.
Figure 28:
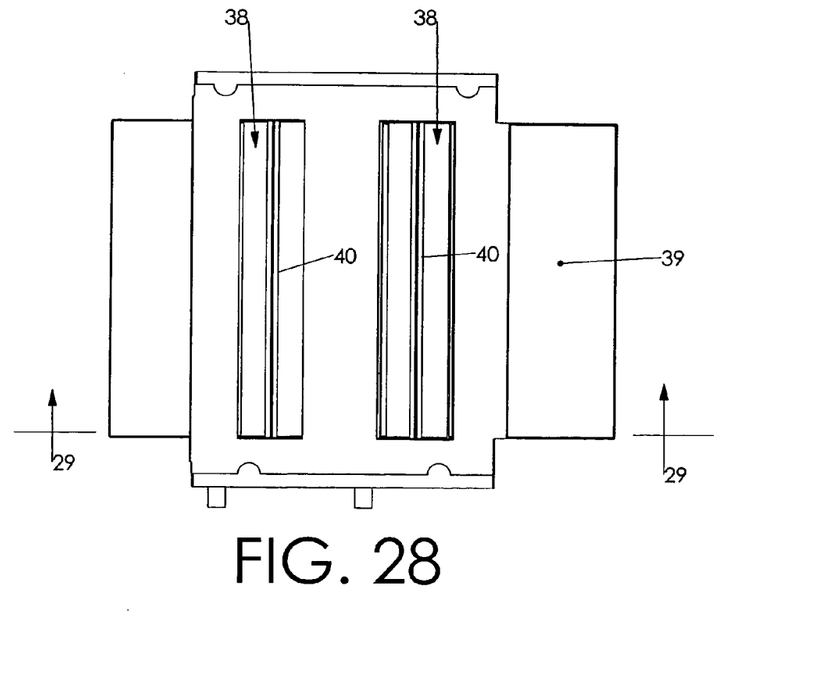
Figure 29:
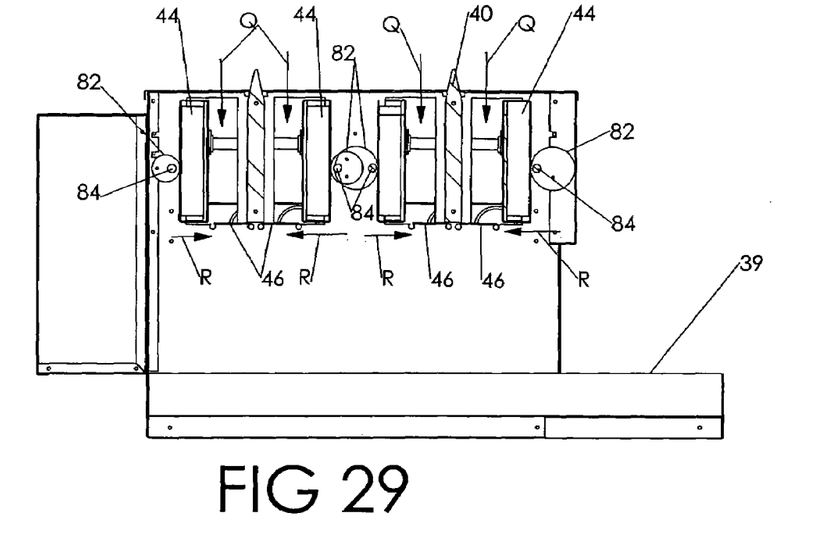
Figure 30:
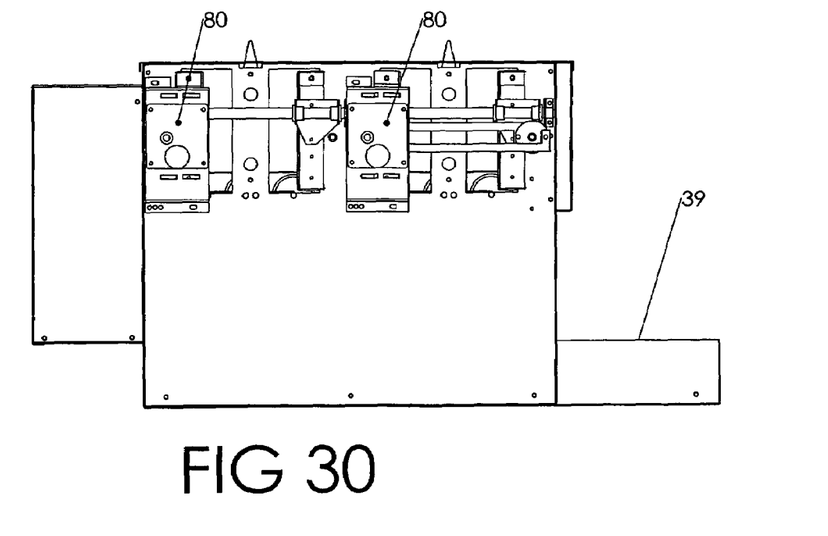

FIGS. 25 and 26 show a screen, generally designated 78, which includes a plurality of wires 78a. The screens are mounted to the outside surfaces of movable platens 44 as seen in FIG. 4. The screens prevent the bread-type food products from sticking to the movable platens. The screens have generally square openings 78b to accommodate "club" sections of apparatus 32 within smaller openings 36 (FIG. 1) of the apparatus as described immediately below.

Specifically, when a sandwich, such as a hamburger, includes more than one meat patty, the bun may include a center slice of bread product to separate the patties. In the industry, this slice is commonly called a "club". Therefore, center fixed platen 40 is extended within housing 34 into smaller openings 36 where by the smaller openings define surface toasting chambers which include a center fixed, heated platen 40A as best seen in FIG. 2. As stated, this center heated platen can simply be an extension of center fixed heated platen 40 described above. A pair of movable platens 44A can be connected for movement with movable platens 44. However, movable platens 44A preferably are heated platens so that the club of the bun is surface toasted on both sides thereof. With each opening 36 including a center fixed heated platen 40A and two movable heated platens 44A, four clubs of four buns can be accommodated by apparatus 32. Turning back to FIG. 25, the enlarged openings 78b in screens 78 are sufficiently large to circumscribe the entire club sections without interfering with the components thereof so that surface toasting of opposite sides of the clubs can be accomplished.

FIGS. 27–30 show a second embodiment of the invention wherein like reference numerals have been applied wherever possible to refer to like components described above in relation to the first embodiment of FIGS. 1–26. Specifically, a dual function heating and toasting apparatus 32 includes a housing 34 defining a pair of heating/toasting chambers 38 which lead to a service tray 39. A center, fixed heated platen 40 is mounted within each chamber. A pair of movable platens 44 are mounted similar to the first embodiment for movement toward and away from the fixed platen. Pivotally mounted gates 46 close and open the spaces on opposite sides of the fixed platen inside the movable platens. The gates can be operated by a similar solenoid, cam plate, lift rod system as described above in relation to the first embodiment.

Rather than a link arm system as described above in relation to FIG. 6 of the first embodiment, the second embodiment of FIGS. 27–30 include four motors 80 which rotate four cams 82 which are circular but eccentric in relation to rotating shafts 84 which are rotatably operated by motors 80. Again, a microprocessor can be used to operate the motors in a predetermined sequence in conjunction with the operation of gates 46.

In operating the second embodiment of FIGS. 27–30, the bread-type food products are deposited into chambers 38 in the direction of arrows "Q" (FIG. 29) with movable platens 44 spaced from fixed platens 40. The products are maintained in the spaces between the respective platens until they are radiantly heated to a given degree, whereupon gates 46 are opened to drop the products into service tray 39.

If it is desired to surface toast the products in the second embodiment of the invention, the products again are deposited in the direction of arrows "Q" in the spaces between the fixed center platen and the outside movable platens. The movable platens then are moved inwardly in the direction of arrows "R" to press the flat surfaces of the products, such as the flat surfaces of buns, against the center, heated platen. After a predetermined amount of time, the movable platens are moved back outwardly, opposite the direction of arrows "R", gates 46 are dropped and the processed products fall into service tray 39.

As with the first embodiment, movable platens 44 can be programmed to back-off from the fixed platen a small amount to allow buns, for instance, to expand while still maintaining the flat surfaces of the buns in engagement with the center heated platen, whereafter the buns can be completely released and gates 46 dropped. While the center fixed platen 40 of the second embodiment is a heated platen, movable platens 44 again may be fabricated of heat conductive material for absorbing and radiating heat from the center, heated platen during the "breakfast" mode of the apparatus.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

The invention claimed is:

1. A dual function heating and toasting apparatus for radiantly heating or surface toasting bread-type food products, comprising:
a housing defining a heating/toasting chamber;
a generally vertically oriented, center fixed heating platen disposed in the chamber;
a pair of generally vertically oriented, outside fixed heating platens spaced outwardly from opposite sides of the center fixed platen;
a pair of generally vertically oriented, movable heating platens disposed on opposite sides of the center fixed platen inside the pair of outside fixed platens; and
gate means movably mounted on the housing near the bottoms of the platens for movement between a closed position to hold a product between the platens and an open position allowing a finished product to exit the chamber,
whereby a bagel-like product can be placed into the chamber onto the gate means between one of the movable platens and one of the fixed platens and spaced therefrom to heat the bagel by radiant heat, or a product such as a bun can be placed into the chamber onto the gate means between one of the movable platens and one of the fixed platens with the movable platen biasing the bun against the fixed platen to surface toast the bun, the gate means being movable to the open position to allow the heated bagel or the toasted bun to exit the chamber.

2. The apparatus of claim 1 wherein said movable platens are movable between heating positions spaced away from the outside fixed platens for radiantly heating a pair of products therebetween, and toasting positions toward the center fixed platens for surface toasting a pair of products on opposite sides thereof.

3. The apparatus of claim 1 wherein said fixed heating platens are heated platens.

4. The apparatus of claim 3 wherein said movable heating platens are fabricated of heat conductive material for absorbing and radiating heat from the heated fixed platens.

5. The apparatus of claim 1 wherein said gate means are pivotally mounted on the housing for pivotal movement between a raised, closed position and a lowered, open position.

6. The apparatus of claim 5, including at least one solenoid mounted on the housing and mechanically coupled to the gate means to pivot the gate means between the raised and lowered positions.

7. The apparatus of claim 6, including at least one cam pivotally mounted on the housing and including a cam profile engageable with the gate means, said solenoid being operatively associated with the cam for pivoting the cam.

8. The apparatus of claim 1 wherein said movable platens are horizontally slidably mounted on the housing, and including at least one motor mechanically coupled to the movable platens to move the platens between the heating and toasting positions.

9. The apparatus of claim 8 wherein said motor includes a rotating member eccentrically connected by link arms to the slidably mounted movable platens.

10. The apparatus of claim 1, including a screen on the side of each movable platen which faces the fixed platen against which the product is surface toasted.

11. The apparatus of claim 1 wherein said heating/toasting chamber comprises a main chamber, and the housing includes an auxiliary toasting chamber for surface toasting both sides of a product such as a club section of a bun.

12. The apparatus of claim 11, including a generally vertically oriented, fixed heated platen in the auxiliary toasting chamber, and a generally vertically oriented movable heated platen for biasing the club section against the fixed platen and surface toasting both sides of the club section.

13. The apparatus of claim 12 wherein said fixed heated platen in the auxiliary toasting chamber comprises an extension of the center fixed platen in the main chamber.

14. The apparatus of claim 13, including a pair of said movable heated platens at opposite sides of the fixed heated platen in the auxiliary toasting chamber for toasting both sides of a pair of club sections.

15. A dual function heating and toasting apparatus for heating or toasting bread-type food products, comprising:
a housing defining a heating/toasting chamber;
a generally vertically oriented, fixed heating platen disposed in the chamber;
a generally vertically oriented movable heating platen disposed in the chamber and mounted for movement toward and away from the fixed platen between a heating position and a surface toasting position; and
a gate movably mounted on the housing near a lower area of the platens for movement between a closed position holding a product between the platens and an open position allowing the product to exit the chamber,
whereby a bagel-like product can be placed into the chamber onto the gate with the movable platen in its heating position to radiantly heat the bagel, or a product such as a bun can be placed in the chamber between the platens onto the gate and the movable platen moved from its heating position to its toasting position biasing the bun against the fixed platen to surface toast the bun, the gate being movable to its open position to allow either the heated bagel or the toasted bun to exit the chamber.

16. The apparatus of claim 15 wherein said fixed heating platen is a heated platen.

17. The apparatus of claim 16 wherein said movable platen is fabricated of a heat conductive material for absorbing and radiating heat from the heated fixed platen.

18. The apparatus of claim 15 wherein said gate means are pivotally mounted on the housing for pivotal movement between a raised, closed position and a lowered, open position.

19. The apparatus of claim 15, including a screen on the side of the movable platen which faces the fixed platen against which the product is surface toasted.

20. A dual function heating and toasting apparatus for heating or toasting bread-type food products, comprising:
a housing defining a heating/toasting chamber;
a generally vertically oriented, fixed heating platen disposed in the chamber, the fixed platen being a heated platen;
a pair of generally vertically oriented movable heating platens disposed on opposite sides of the fixed platen and being fabricated of heat conductive material for absorbing and radiating heat from the heated fixed platen; and gate means movably mounted on the housing near the bottoms of the platens for movement between a closed position to hold a product between the platens and an open position allowing a finished product to exit the chamber, whereby a bagel-like product can be placed into the chamber onto the gate means between one of the movable platens and the fixed platen and spaced therefrom to heat the bagel by radiant heat, or a product such as a bun can be placed into the chamber onto the gate means between one of the movable platens and the fixed platen with the movable platen biasing the bun against the fixed platen to surface toast the bun, the gate means being movable to the open position to allow the heated bagel or the toasted bun to exit the chamber.

21. The apparatus of claim 20 wherein said gate means are pivotally mounted on the housing for pivotal movement between a raised, closed position and a lowered, open position.

22. The apparatus of claim 20, including a screen on the side of each movable platen which faces the fixed platen against which the product is surface toasted.

23. A method of surface toasting a bread-type food product, comprising the steps of:

providing a toasting apparatus having a fixed heated platen and a movable platen;

depositing a product between the platens while in spaced condition;

moving the movable platen toward the fixed platen to bias the product against the fixed platen and surface toast the product;

backing the movable platen away from the fixed platen an amount sufficient for the product to expand but not completely release the product from the fixed platen before a toasting cycle is completed; and when the toasting cycle is completed moving the movable platen completely away from the fixed platen to completely release the product from the fixed platen.

* * * * *